United States Patent [19]

Rush, III

[11] Patent Number: 5,621,922

[45] Date of Patent: Apr. 22, 1997

[54] SPORTS HELMET CAPABLE OF SENSING LINEAR AND ROTATIONAL FORCES

[76] Inventor: Gus A. Rush, III, 1800 12th St., Meridian, Miss. 39301

[21] Appl. No.: 575,490

[22] Filed: Dec. 20, 1995

Related U.S. Application Data

[63] Continuation-in-part of Ser. No. 471,360, Jun. 6, 1995, Pat. No. 5,539,935, which is a continuation-in-part of Ser. No. 288,078, Aug. 10, 1994, Pat. No. 5,546,609, which is a continuation-in-part of Ser. No. 66,670, May 25, 1993, Pat. No. 5,390,367, which is a continuation-in-part of Ser. No. 964,875, Oct. 22, 1992, Pat. No. 5,287,567, which is a continuation-in-part of Ser. No. 818,840, Jan. 10, 1992, abandoned.

[51] Int. Cl.$^6$ ........................................................ A42B 3/30
[52] U.S. Cl. ............... 2/422; 2/425; 2/906; 455/100; 340/669; 73/510; 362/105
[58] Field of Search ............................ 2/422, 413, 906, 2/905, 2, 425; 340/669; 455/100; 362/103, 105, 106; 73/510, 504.03

[56] References Cited

U.S. PATENT DOCUMENTS

| | | |
|---|---|---|
| 3,106,716 | 10/1963 | Beebe . |
| 3,134,106 | 5/1964 | Shaffer et al. . |
| 3,430,979 | 3/1969 | Terry et al. . |
| 3,649,788 | 3/1972 | Heckendorf . |
| 3,855,631 | 12/1974 | Ettinger . |
| 3,859,650 | 1/1975 | Prachar . |
| 4,178,016 | 12/1979 | Andres et al. . |
| 4,243,248 | 1/1981 | Scholz . |
| 4,274,161 | 6/1981 | Littler . |
| 4,321,433 | 3/1982 | King . |
| 4,324,005 | 4/1982 | Willis . |
| 4,502,035 | 2/1985 | Obenauf et al. ............... 340/669 X |
| 4,559,679 | 12/1985 | Downey . |
| 4,566,137 | 1/1986 | Gooding . |
| 4,581,776 | 4/1986 | Kie . |
| 4,586,200 | 5/1986 | Poon . |
| 4,637,074 | 1/1987 | Taheri . |
| 4,654,010 | 3/1987 | Havriluk . |
| 4,663,785 | 5/1987 | Comparetto . |
| 4,931,913 | 6/1990 | Hwang . |
| 4,944,044 | 7/1990 | Zarotti . |
| 4,996,720 | 3/1991 | Fair . |
| 5,003,631 | 4/1991 | Richardson . |
| 5,014,365 | 5/1991 | Schulz . |
| 5,083,320 | 1/1992 | Halstead . |
| 5,091,992 | 3/1992 | Pusic . |
| 5,123,408 | 6/1992 | Gaines . |
| 5,129,107 | 7/1992 | Lorenzo . |
| 5,133,084 | 7/1992 | Martin . |
| 5,153,945 | 10/1992 | Kobayashi et al. . |
| 5,178,012 | 1/1993 | Culp .......................................... 73/510 |
| 5,287,562 | 2/1994 | Rush, III . |
| 5,329,637 | 7/1994 | Walker . |
| 5,353,008 | 10/1994 | Eikenberry et al. . |
| 5,383,363 | 1/1995 | Kulmaczewski ........................... 73/510 |
| 5,390,367 | 2/1995 | Rush, III . |
| 5,402,535 | 4/1995 | Green . |

FOREIGN PATENT DOCUMENTS

| | | |
|---|---|---|
| 0043990 | 1/1982 | European Pat. Off. . |
| 2499373 | 8/1982 | France . |
| 2561200 | 9/1985 | France . |
| 1944821 | 3/1971 | Germany . |
| 2717712 | 10/1978 | Germany . |
| 3142962 | 6/1983 | Germany . |

OTHER PUBLICATIONS

Lineback, "Football–Helmet Radio to be Tested by NFL", Nov. 12, 1984, pp. 22 and 24.

"Airman's Airbags", Popular Mechanics, Jul. 1992, p. 22.

Segre, "Staying Alive", Power and Motoryacht, Jul. 1992, pp. 52–53.

*Primary Examiner*—Peter Nerbun
*Attorney, Agent, or Firm*—Cushman Darby & Cushman IP Group of Pillsbury Madison & Sutro LLP

[57] ABSTRACT

A signalling device is installed in headwear, such as an athletic helmet, and includes sensing devices for detecting linearly and rotationally directed impacts above a selected magnitude. The sensing devices trigger the signalling device so as to produce a perceivable signal, thereby alerting observers that a potentially injurious impact has occurred.

12 Claims, 2 Drawing Sheets

SPORTS HELMET CAPABLE OF SENSING LINEAR AND ROTATIONAL FORCES

This application is a continuation-in-part of application Ser. No. 08/471,360, filed Jun. 6, 1995, now U.S. Pat. No. 5,539,935 which is a continuation-in-part of application Ser. No. 08/288,078, filed Aug. 10, 1994, now U.S. Pat. No. 5,546,609 which is a continuation-in-part of application Ser. No. 08/066,670, filed May 25, 1993, now U.S. Pat. No. 5,390,367, which is a continuation-in-part of application Ser. No. 964,875, filed Oct. 22, 1992, now U.S. Pat. No. 5,287,562, which is a continuation-in-part of application Ser. No. 07/818,840, filed Jan. 10, 1992 (abandoned).

FIELD OF THE INVENTION

The present invention relates to a helmet which is provided with at least one linear force sensing device and at least one rotational force sensing device, together with one or more signaling devices connected to the sensing devices. More particularly, the sensing devices are adapted to respond to accelerations corresponding to, for example, impacts experienced by the wearer of the helmet.

BACKGROUND OF THE INVENTION

Physical harm to the participants in athletic events frequently occurs as a result of collisions between themselves, such as in football, soccer, field hockey and the like. Particularly with regard to football, which involves deliberate collisions between players, school authorities have become sensitive to the risk of injury to which student participants are exposed, as well as to the liability of the school system when injury results. As a result, extensive supervised training is necessary to identify student players who engage in reckless behavior on the athletic field or who do not appreciate the dangers to which they and others are subject by certain types of impacts experienced in these athletic endeavors. One particularly troublesome problem is when a student athlete experiences a head injury, such as a concussion, of undetermined severity. In general, it is difficult to quickly determine the severity of the concussion so as to enable a coach, game official, or even a medical doctor to determine whether the student can continue play. The same problem arises in the professional sports leagues where the stakes are much higher for a team, where such a team loses a valuable player due to the possibility of a severe head injury.

Recent medical data suggest that rotational forces applied to the head and neck area (for example, flexion/extension, lateral flexion, and axial rotation) are more responsible for axonal nerve damage than previously thought. Previous medical research had indicated that axially directed forces (such as spinal compression forces) were primarily responsible for such injuries.

SUMMARY OF THE INVENTION

The present invention provides an indicating and signaling device which indicates the magnitude of a collision impact experienced by an individual during an athletic event. In one specific embodiment, the present invention uses three orthogonally oriented linear force sensing devices and at least one rotational force sensing device (preferably, three), each capable of providing an electrical output to a signaling device such as a lamp or an LED. The orthogonally oriented linear force sensing devices are tri-axially oriented in a module which is incorporated into the helmet of the user.

The at least one rotational force sensing device is also incorporated into the helmet at a location which enables it to sense rotational forces applied to the helmet and, therefore, the head. Depending on the location of the module containing the orthogonally oriented linear force sensing devices, the at least one rotational force sensing device may be incorporated therein. Further, each sensing device is adjustable so that each can be modulated to provide a perceivable signal when an impact above a selected magnitude occurs. Such a signal may include actuation of a light-emitting device, such as an LED, corresponding to a respective sensing device. With this arrangement, a coach or other supervisor can detect when an impact of dangerous magnitude is experienced or inflicted by a player, since the impact will cause at least one of the sensing devices, depending on the direction(s) in which it is inflicted, to actuate a corresponding signaling device which will be visible on a portion of the helmet. In a preferred arrangement, the illuminated sensing devices remain illuminated for a selected time interval up to at least several hours to afford an official or coach sufficient time to inspect each helmet after play concludes.

If an athlete suffers a concussion, for example, it will be possible to determine if the relative magnitude of an impact is dangerously high relative to the threshold to which each sensing device is adjusted, taking into consideration the size and weight of the player. Thus, when one of the sensing devices is activated, thereby illuminating a signaling LED or lamp in the helmet, a game official and/or a coach will be able to immediately determine that play should be stopped and that the potentially injured player should be attended to. This arrangement allows players injured only slightly to continue to play in an athletic contest while minimizing the risk of serious injury.

BRIEF DESCRIPTION OF THE DRAWINGS

The foregoing and other objects will become apparent as consideration is given to the following detailed description taken in conjunction with the accompanying drawings, in which.

DETAILED DESCRIPTION OF THE INVENTION

Figure 1:
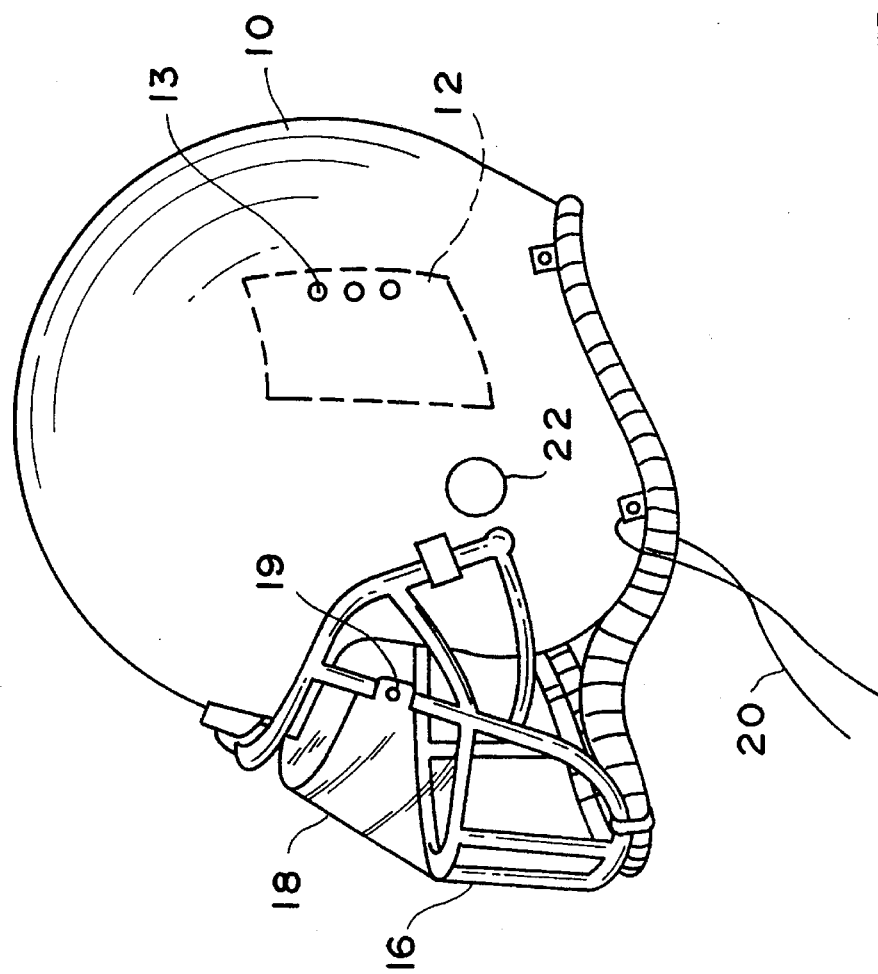
FIG. 1 is a perspective view of a protective helmet utilizing the sensing and signaling arrangement of the present invention.

Referring now to the drawings, wherein like numbers correspond throughout the several views, FIG. 1 illustrates a helmet 10 in which a sensing and signaling module 12 is incorporated. The module 12 includes signaling lamps 13 arranged in any suitable pattern so as to be easily perceivable by someone observing a player wearing the helmet. The helmet 10 is typically made from high impact polycarbonate and is provided with the conventional face protector 16 and mask 18 secured by clips 19, as well as a chin strap 20 which secures the helmet 10 to the head of the user. Therefore, movement of the head results in a matching movement of the helmet. This is effected by suitable padding or foam lining for the helmet 10 as is conventional.

Preferably the module 12 is located just to the rear of either the left or right ear hole 22 of the helmet 10. This location makes signalling lamps 13 more visible to a game official or coach and also protects the module 12 from unnecessary impact during an athletic contest. Even if such extraneous impacts occur, however, the module 12 can be made from a rugged polyethylene casing which need not be bulky to provide the desired sensing function as described below. Indeed, with conventionally available accelerometers, the thickness of the module 12 can be as little as one-half inch while the circuit elements can be mounted on a board or formed into a single chip. The signalling lamps 13 may be, for example, LED devices, which are known for their rugged construction and low space requirements. Each LED device can be powered by a single lithium or other portable battery as described below.

Figure 2:
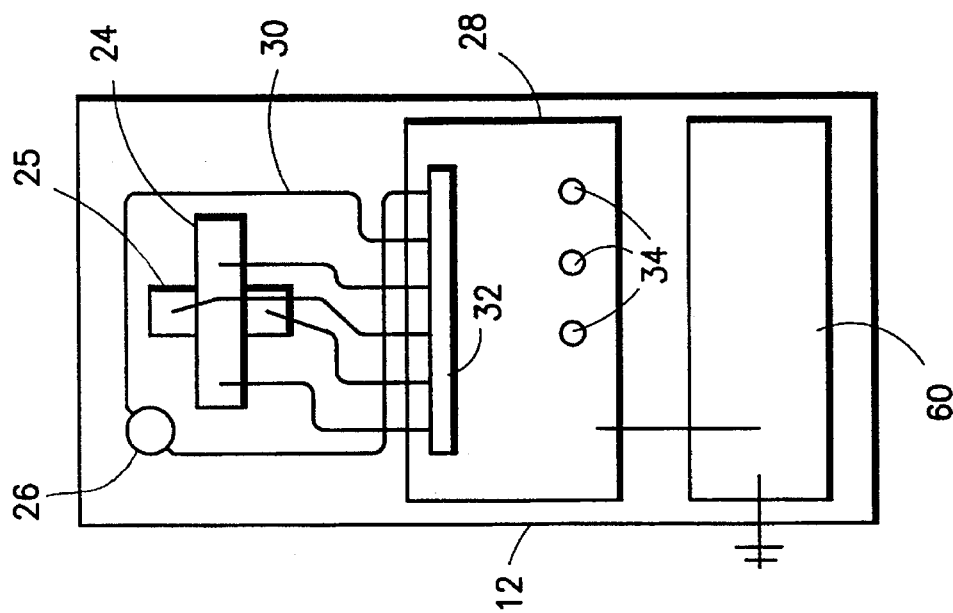
FIG. 2 is a schematic view of the circuit arrangement and sensing devices used with the helmet of FIG. 1.

Referring to FIG. 2, a schematic view of a module 12 is illustrated, which includes, in one embodiment, a plurality of orthogonally disposed cylindrical accelerometers 24, 25 and 26. Cylindrical accelerometers 24, 25, 26 are substantially identical and are electrically connected to a control device 28 by conductors, such as wire or wires, one of which is indicated at 30. Each of the cylindrical accelerometers 24, 25, 26 have opposite ends electrically connected by respective conductors 30 to an input board 32 of the control device 28. Signalling lamps 13 are connected to module 28 in any conventional manner.

Figure 3:
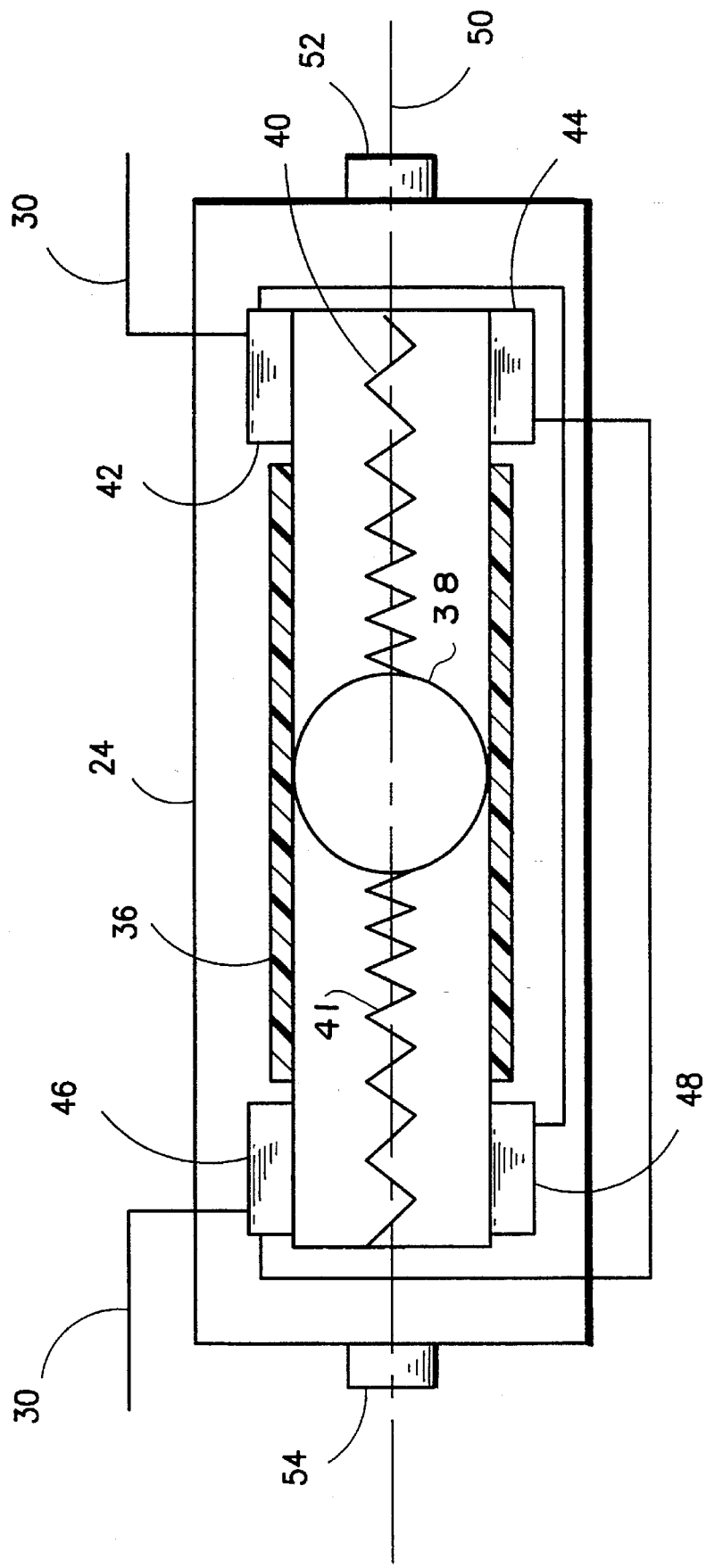
FIG. 3 is side sectional view in elevation of one of the linear force sensing devices useful in the present invention.

With reference to FIG. 3, one embodiment of a cylindrical accelerometer 24 useful in the present invention is shown. It should be recalled that the cylindrical accelerometers 25 and 26, according to this embodiment, will be of identical construction. It should also be understood that other types of commercially available linear accelerometers may be employed. In the embodiment illustrated in FIG. 3, the cylindrical accelerometer 24 includes a tubular inner resilient lining 36 and an electrically conductive ball bearing 38 of known mass. The ball bearing 38 is maintained in a generally central position in the race defined by the interior surface of the resilient lining 36 by a pair of opposing springs 40. At the opposite ends of the race are respective pairs of contacts: 42 and 44 on the right, as seen in FIG. 3, and 46 and 48, on the left, as seen in FIG. 3. When the cylindrical accelerometer 24 is acted upon by an impact, causing rapid deceleration substantially parallel to the axis 50, the ball bearing 38 tends to move along a restrained path generally in the deceleration direction defined by the axis 50 until one of the respective pairs of contacts are contacted. At this point, a circuit is made from a battery, (conventional and not shown here), through the opposing pairs of contacts, such as 42 and 44, and the ball bearing 38, to provide an output signal to the control device 28 in the form of an electrical pulse. The magnitude of the impact necessary to cause movement of the ball bearing 38 can be controlled by adjusting the compressive force of the springs 40 and 41, using threaded end caps 52 and 54, which engage respective ends of the springs and which can be adjusted as desired. For proper calibration, rotation of the respective end caps 52 or 54 will increase or decrease the compressive force applied by each respective spring. The drag on the movement of the ball bearing 38 imposed by the resilient lining 36 will be relatively slight, but will provide stability for the ball bearing 38 so that minor jostling of the head will not cause premature actuation of the signaling device.

Referring back to FIG. 2, it is also within the scope of the present invention to provide a remote signaling device wherein a transmitter 60 is connected to the output of the control device 28 for transmitting to either the sidelines or another remote site a signal indicating that one of the sensing devices 24, 25 or 26 has been actuated.

Referring to FIG. 1, it is also within the scope of the present invention to provide at least one sensing device, and preferably three, in the helmet to sense rotational forces applied to the helmet, and, in turn, to the player's head and neck. The rotational force sensing device itself may be selected from among known devices which are useful for detecting rotational forces.

For example, AMP Inc. manufactures an accelerometer (model no. ACH 04-08) with adjustable sensitivity and which detects, in part, rotation about a given axis. The AMP device operates according to the flexure of a cantilever beam portion corresponding to a detected rotational acceleration, which causes a strain in a piezoelectric material portion.

Accordingly, FIG. 1 schematically illustrates a second module 14 containing a rotational force sensing device, such as the AMP Inc. device, incorporated into substantially the top of helmet 10. This permits, for example, the detection of rotational forces causing axial rotation (i.e., left-right) rotation of the head.

The module 14 may, for example, include its own control device, signalling lamps, and the like, similar to the arrangement of module 12. However, module 14 may also be simply connected to input board 32 of control device 28 in module 12, by, for example, wire or wires 17. In addition, the rotational force sensing device of module 14 may be connected to the group of signalling lamps 13 provided on the side of helmet 10.

Second and third rotational force sensing devices are preferably also provided in addition to that contained in module 14. For example, a second rotational force sensing device could be incorporated into the module 12 located substantially at the side of the helmet in order to detect flexion and extension of the head and neck. Also, a third rotational force sensing device could be provided at, for example, the back of the helmet so as to detect lateral flexion of the head and neck. As with the rotational force sensing device of module 14, the second and third rotation sensing devices may, for example, be electrically connected to the control device 28 and signalling lamps 13 provided in module 12. The number of signalling lamps 13 would correspond to the number of sensing devices, both linear and rotational, provided.

Finally, the rotational force sensing devices may also be operably connected to transmitter 60 so that the data therefrom can be interpreted remotely.

It will be apparent from the foregoing that various modifications may be made to the present invention and all are included within the scope of the appended claims.

What is claimed is:

1. Headwear comprising a covering for enclosing at least a portion of the head of a user, said covering including:

a plurality of sensing devices, including at least one first sensing device constructed and arranged to detect a linear force and at least one second sensing device constructed and arranged to detect a rotational force, said plurality of sensing devices each being constructed and arranged to generate a signal in response to a sensed acceleration greater than a threshold acceleration; and a signalling device connected to said plurality of sensing devices and being constructed and arranged to generate a perceivable signal in response to a signal received from either one of said plurality of signalling devices.

2. Headwear according to claim 1, wherein said covering further includes a transmitter device constructed and arranged to transmit a signal corresponding to a signal generated by either one of said plurality of sensing devices to a remote receiver.

3. Headwear according to claim 1, wherein said at least one first sensing device is oriented so as to sense a linear force directed substantially parallel to the spinal axis of the user.

4. Headwear according to claim 1, wherein said covering includes three said first sensing devices, wherein said three first sensing devices are oriented relative to one another so as to sense linear forces directed along three substantially orthogonal axes.

5. Headwear according to claim 1, wherein said at least one first sensing device comprises:

an elongate housing having an axis therealong;

an electrical contact provided at a first end of said housing;

a movable member disposed within said housing and being constructed and arranged to move substantially only along said axis of said housing;

a resilient member provided in said housing and arranged so as to restrain movement of said movable member toward said electrical contact provided at said first end of said housing, said resilient member being constructed and arranged to provide an adjustable restraining force, such that a sensed acceleration which is greater than a threshold acceleration corresponding to said adjustable restraining force and which is directed generally along said axis of said housing causes said movable member to move toward and contact said electrical contact.

6. Headwear according to claim 5, wherein said housing includes a lining which resists movement of said movable member.

7. Headwear according to claim 5, wherein said movable member is electrically conductive, contact between said movable member and said electrical contact closing an electrical circuit for generating a signal for actuating said signalling device.

8. Headwear according to claim 5, wherein said at least one sensing device further comprises an electrical contact provided at a second end of said housing opposite said first end thereof, whereby said at least one sensing device can sense oppositely acting linear forces directed substantially along said axis of said housing.

9. Headwear according to claim 1, wherein said at least one second sensing device is oriented so as to sense rotation of the head of the user.

10. Headwear according to claim 1, wherein said covering includes three said second sensing devices which are oriented so as to sense rotation, flexion and extension, and lateral flexion of the head of the user, respectively.

11. Headwear according to claim 1, wherein at least said at least one first sensing device and said signalling device are mounted together in a module which is mounted with respect to said covering.

12. Headwear according to claim 11, wherein said at least one second sensing device is provided in a different location than said at least one first sensing device with respect to said covering.

* * * * *

UNITED STATES PATENT AND TRADEMARK OFFICE
CERTIFICATE OF CORRECTION

PATENT NO.        : 5,621,922
APPLICATION NO. : 08/575490
DATED             : April 22, 1997
INVENTOR(S)       : Gus A. Rush, III It is certified that error appears in the above-identified patent and that said Letters Patent is hereby corrected as shown below:

Col. 4, Claim 1, line 65, replace "from either one of said plurality of signalling devices."

with --from either one of said plurality or sensing devices.--

Signed and Sealed this

Twenty-ninth Day of May, 2007

JON W. DUDAS
*Director of the United States Patent and Trademark Office*